United States Patent
Heid et al.

(10) Patent No.: US 11,905,217 B2
(45) Date of Patent: Feb. 20, 2024

(54) REFRACTORY BATCH, A METHOD FOR PRODUCING AN UNSHAPED REFRACTORY CERAMIC PRODUCT FROM THE BATCH AND AN UNSHAPED REFRACTORY CERAMIC PRODUCT OBTAINED BY THE METHOD

(71) Applicant: Refractory Intellectual Property GmbH & Co. KG, Vienna (AT)

(72) Inventors: Stefan Heid, Leoben (AT); Roland Nilica, St. Marein Feistritz (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 785 days.

(21) Appl. No.: 16/643,267

(22) PCT Filed: Nov. 8, 2018

(86) PCT No.: PCT/EP2018/080585
§ 371 (c)(1),
(2) Date: Feb. 28, 2020

(87) PCT Pub. No.: WO2019/120737
PCT Pub. Date: Jun. 27, 2019

(65) Prior Publication Data
US 2020/0207665 A1    Jul. 2, 2020

(30) Foreign Application Priority Data

Dec. 19, 2017  (EP) ..................... 17208542

(51) Int. Cl.
| | | |
|---|---|---|
| C04B 35/04 | (2006.01) | |
| C04B 35/626 | (2006.01) | |
| C04B 35/63 | (2006.01) | |
| C04B 35/634 | (2006.01) | |
| C21B 13/12 | (2006.01) | |

(52) U.S. Cl.
CPC .......... *C04B 35/04* (2013.01); *C04B 35/6264* (2013.01); *C04B 35/6303* (2013.01); *C04B 35/63424* (2013.01); *C21B 13/12* (2013.01); C04B 2235/3206 (2013.01); C04B 2235/3217 (2013.01); C04B 2235/3418 (2013.01); C04B 2235/402 (2013.01); C04B 2235/425 (2013.01); C04B 2235/448 (2013.01); C04B 2235/602 (2013.01); C04B 2235/9676 (2013.01)

(58) Field of Classification Search
CPC . C04B 35/04; C04B 35/6264; C04B 35/6303; C04B 35/63424; C04B 2235/3206; C04B 2235/3217; C04B 2235/3418; C04B 2235/402; C04B 2235/425; C04B 2235/448; C04B 2235/602; C04B 2235/9676; C21B 13/12
See application file for complete search history.

(56) References Cited

U.S. PATENT DOCUMENTS 4,061,501 A    12/1977  Ivarsson et al.

FOREIGN PATENT DOCUMENTS

| IT | 1113709 B | * | 1/1986 | ............. B22D 41/02 |
|---|---|---|---|---|
| KR | 20000040776 A | * | 7/2000 | |
| KR | 2006071526 A | * | 6/2006 | |
| KR | 10-2008-0070487 A | | 7/2008 | |
| RU | 2114799 C1 | | 7/1998 | |
| RU | 2129535 C1 | | 4/1999 | |
| RU | 2292321 C1 | | 1/2007 | |
| RU | 2379260 C1 | | 1/2010 | |
| WO | 2008091041 A1 | | 7/2008 | |
| WO | 2019120737 A1 | | 6/2019 | |

OTHER PUBLICATIONS

Machine Translation of KR 2006071526 A. (Year: 2006).*
Machine Translation of KR 20000040776 A. (Year: 2000).*
Machine Translation of IT 1113709 B. (Year: 1986).*
"International Search Report for PCT Patent Application No. PCT/EP2018/080585", dated Dec. 6, 2018, 3 Pages.
"Examination Report for Indian Patent Application No. 202047011843", dated Jul. 29, 2022, 6 pages.
"Office Action for Japanese Patent Application No. 2020-515871", dated Oct. 11, 2022, 15 pages.
"Office Action for Vietnam Patent Application No. 1-2020-01695", dated Apr. 27, 2023, 2 pages.
"Examination Report for Korean Patent Application No. 10-2020-7008050", dated Nov. 20, 2023, 9 pages.

* cited by examiner

*Primary Examiner* — Coris Fung
*Assistant Examiner* — Catriona M Corallo
(74) *Attorney, Agent, or Firm* — Calfee, Halter & Griswold LLP

(57) ABSTRACT

The invention relates to a refractory batch, to a method for producing an unshaped refractory ceramic product from the batch, and to an unshaped refractory ceramic product obtained by said method.

10 Claims, No Drawings

REFRACTORY BATCH, A METHOD FOR PRODUCING AN UNSHAPED REFRACTORY CERAMIC PRODUCT FROM THE BATCH AND AN UNSHAPED REFRACTORY CERAMIC PRODUCT OBTAINED BY THE METHOD

The invention relates to a refractory batch, a method for producing an unshaped refractory ceramic product from the batch and an unshaped refractory ceramic product obtained by the method.

The term "refractory ceramic product" in the sense of the invention refers in particular to refractory products with an operating temperature of more than 600° C. and preferably to refractory materials according to DIN 51060: 2000-6, i.e. materials with a pyrometric cone equivalent >SK 17. The determination of the pyrometric cone equivalent can be carried out in particular according to DIN EN 993-12: 1997-06.

As is well known, a "refractory batch" is a composition of one or more components or raw materials by which a refractory ceramic product can be produced by means of a temperature treatment, i.e. in particular by means of firing.

The method according to the invention serves to produce an unshaped refractory ceramic product from the batch according to the invention. Accordingly, the batch according to the invention is used as a so-called "refractory mass", in particular as a refractory basic castable. The refractory ceramic product obtained by the method according to the invention is thus present as an unshaped refractory ceramic product, i.e. as a product obtained by introducing the batch according to the invention in unshaped form at the place of use of the refractory ceramic product, in particular by casting, and subsequently firing it there to form an unshaped refractory product.

Refractory basic castables are typically in the form of chemically or hydraulically bonded casting mixes. Such masses have a basic component consisting of one or more raw materials based on magnesia, in particular sintered magnesia or fused magnesia. In chemically bonded basic castables, the basic component is chemically bonded, for example, via a phosphate binder. In the case of hydraulically bonded basic castables, the binding takes place via a hydraulic binder, for example alumina cement.

Compared to a chemical or hydraulic bond, a ceramic bond has considerable advantages, for example, generally higher refractoriness and corrosion resistance, especially improved hot bending strength and improved resistance to slag infiltration. A batch for the production of a ceramic bonded basic castable is disclosed in EP 825 968 B2. This batch comprises a basic component in the form of sintered magnesia, a carbon component in the form of graphite and water. In principle, such a batch has proven to be useful for the production of a ceramic bonded basic refractory castable. However, it is not possible to add an antioxidant in the form of aluminum to suppress the oxidation of the carbon component.

In this respect it is known to suppress the oxidation of carbon with atmospheric oxygen in carbon-containing batches by the presence of so-called antioxidants. Antioxidants are especially known as powders of aluminum, silicon, magnesium and their alloys. These powders react with the carbon of the batch to form carbides as well as with atmospheric oxygen during the temperature application of the mass, thus reducing the oxidation of the carbon. The carbides formed can also have a positive effect on the strength of the resulting fired product. Aluminum powders are preferred as antioxidants, as aluminum is a more effective antioxidant than silicon and magnesium for thermodynamic reasons.

However, in a batch according to EP 825 968 B2, the use of aluminum as an antioxidant would prove extremely difficult, especially in a basic environment, as aluminum would react immediately with water in the presence of the basic component with the formation of hydrogen, which would lead to considerable damage (especially cracking) in the castable or the fired, unshaped refractory ceramic product made therefrom. Furthermore, the above-mentioned reaction of the aluminum would heat up the castable, which would impair its castability.

In this respect, resins or pitches could be used as binders instead of water. It is known, however, that these have components which volatilize when the batch is exposed to temperature and are odorous or even toxic.

The object of the present invention is to provide a carbonaceous refractory batch for the production of an unshaped basic refractory ceramic product in which aluminum can be used as an antioxidant and an aqueous binder at the same time. A further object of the invention is to provide a batch as above which can be used in the form of a castable. A further object of the invention is to provide a batch as above in which aluminum does not react with the water content of the aqueous binder to form hydrogen or such a reaction is at least largely suppressed. A further object is to provide a batch as above, from which an unshaped refractory basic ceramic product with a good resistance to slag infiltration can be produced, in particular with a better resistance to slag infiltration than products produced from chemically or hydraulically bonded castable. Finally, a further object is to provide a batch as above, from which an unshaped refractory basic ceramic product with a high hot bending strength can be produced, in particular with a better hot bending strength than products made from chemically or hydraulically bonded castables.

According to the invention, to solve this object, a refractory batch is provided which comprises the following components:

a basic component comprising one or more raw materials based on magnesia;

a carbon component comprising one or more carbon carriers;

an aluminum component comprising one or more metallic aluminum carriers;

an aqueous binder; and one or more sulfates with a solubility of at least 15 g per 100 g of water.

Surprisingly, according to the invention, it turned out that in the presence of one or more sulfates with a solubility of at least 15 g per 100 g of water (hereinafter also referred to as "water-soluble sulfates") in a refractory batch, aluminum can be used as an antioxidant together with an aqueous binder for the production of an unshaped refractory product based on magnesia. According to the invention, it has surprisingly turned out that in the presence of one or more such water-soluble sulfates in such a batch, the reaction of the aluminum with the water content of the binder can be completely or at least largely suppressed. Against this background, it is intended according to the invention that a refractory batch is provided for the production of an unshaped refractory ceramic product based on magnesia, which in addition to a basic component based on magnesia, a carbon component, aluminum as antioxidant and an aqueous binder further comprises a component in the form of water-soluble sulfates.

In accordance with the invention, it has turned out that the water-soluble sulfates can effectively develop their advantageous properties, as described above, in generic batches, in particular when they are present in the composition in a proportion of at least 0.05% by mass. In this respect it is preferably provided that the water-soluble sulfates are present in a proportion of at least 0.05% by mass in the batch. From a proportion of 0.1% by mass, the water-soluble sulfates can develop their advantageous properties even more effectively, so that it is preferably provided that the sulfates are present in a proportion of at least 0.1% by mass in the batch, even more preferably in a proportion of at least 0.15% by mass and even more preferably in a proportion of at least 0.2% by mass. The above data in % by mass each is related to the total mass of the batch.

It further turned out that the refractory properties of an unshaped refractory ceramic product which can be produced from the batch can be adversely affected if the water-soluble sulfates are present in the batch in a proportion of more than 1.0% by mass. In particular, it has turned out in this respect that the batch sets more quickly with an increasing mass fraction of the water-soluble sulfates and sets so quickly with a water-soluble sulfate content of more than 1.0% by mass that a processing and use of the batch, in particular as a castable, is practically no longer possible. Such setting can be observed from a proportion of about 0.5% by mass of water-soluble sulfates, so that the setting of the batch can be specifically adjusted by a mass proportion of water-soluble sulfates in the range from 0.5 to 1.0% by mass. In this respect, according to one embodiment it may be provided that the water-soluble sulfates are present in the batch in a proportion of at most 1.0% by mass; this upper limit may be selected in particular if the setting of the batch is also to be adjusted by the water-soluble sulfates. In this respect, according to alternative embodiment, it may be provided that the water-soluble sulfates are present in the batch in a proportion of at most 0.5% by mass; this upper limit may be selected in particular if the water-soluble sulfates are not intended to set the batch. In this respect, the water-soluble sulfates may preferably be present in a proportion in the range from 0.05 to 1.0% by mass in the batch, even more preferably in a proportion of 0.1 to 1.0% by mass and even more preferably in a proportion in the range from 0.2 to 1.0% by mass. Insofar as the water-soluble sulfates are not intended to set the batch, they are preferably present in a proportion in the range from 0.05 to 0.5% by mass in the batch and even more preferably in a proportion in the range from 0.1 to 0.5% by mass. If the water-soluble sulfates are intended to set the batch in a targeted manner, they are preferably present in a proportion in the range of 0.5 to 1.0% by mass in the batch. The above data in % by mass is each related to the total mass of the batch.

According to the invention, it was found that the water-soluble sulfates suppress the reaction of the aluminum with the water content of the binder the more effectively, the higher the solubility of the respective water-soluble sulfate in water is. In this respect, according to a preferred embodiment, it may be provided that the batch comprises one or more sulfates with a solubility not only of at least 15 g per 100 g of water, but with a solubility of at least 20 g per 100 g of water, even more preferably with a solubility of at least 25 g per 100 g of water, even more preferably with a solubility of at least 30 g per 100 g of water and even more preferably with a solubility of at least 35 g per 100 g of water.

A solubility of at least 25 g per 100 g of water is exhibited, for example, by the sulfates sodium sulfate ($Na_2SO_4$, i.e. "disodium sulfate" according to the IUPAC nomenclature; solubility: 28.1 g/100 g $H_2O$), ferrous sulfate ($FeSO_4$, i.e. "ferrous sulfate" according to IUPAC nomenclature; solubility: 29.5 g/100 g $H_2O$), lithium sulfate ($Li_2SO_4$, i.e. "dilithium sulfate" according to IUPAC nomenclature; solubility: 34.2 g/100 g $H_2O$), magnesium sulfate ($MgSO_4$, i.e. "magnesium sulfate" according to IUPAC nomenclature; solubility: 35.7 g/100 g $H_2O$) and aluminum sulfate ($Al_2(SO_4)_3$, i.e. "dialuminum trisulfate" according to IUPAC nomenclature; solubility: 38.5 g/100 g $H_2O$), so that preferably one or more of these water-soluble sulfates, in particular in a total mass in the above-mentioned range, can be present in the batch. Due to their very high solubility in water, at least one of the sulfates magnesium sulfate and aluminum sulfate, in particular in a total mass in the above-mentioned range, may preferably be present in the batch. Due to its particularly high solubility in water, water-soluble sulfate is particularly preferred in the form of aluminum sulfate.

In accordance with the general understanding of this term, "solubility" is defined here as the ratio of the dissolved mass of water-soluble sulfates to the mass of water at room temperature (25° C.) at saturation. A "solubility of at least 25 g per 100 g of water" of a water-soluble sulfate means, for example, that at saturation and room temperature 25 g of this sulfate are dissolved in 100 g of water.

For the determination of solubility, the methods known from the state of the art can be used. For example, water-soluble sulfates can be stirred into 100 g of distilled water at room temperature until a sediment is visible. The solution can then be left to stand for a while, in particular at least about 24 hours, until a clear solution is formed. The solution can then be filtered off and the concentration of the sulfate can be determined by the known methods, e.g. atomic emission spectrometry (AES) or titration. If necessary, the sample can be diluted before determining the concentration.

It is advantageous that the water-soluble sulfates are very soluble in water. In this respect, the water-soluble sulfates are preferentially present dissolved in water, i.e. in dissolved form in the batch. The water-soluble sulfates can be particularly preferred dissolved in the water of the aqueous binder in batch. As the water-soluble sulfates are dissolved in water, especially in the water of the aqueous binder, the water-soluble sulfates can be present in the batch in a particularly uniform and homogeneous distribution over the entire volume of the batch, so that the water-soluble sulfates can develop their advantageous properties with regard to the suppression of the reaction of the aluminum with the water content of the aqueous binder over the entire volume of the batch.

The water-soluble sulfates, especially when dissolved in water as described above, can be present in hydrated form in the batch. For example, aluminum sulfate can be present in this respect in the form of $Al_2(SO_4)_3*17\ H_2O$. Insofar as the water-soluble sulfates are present in hydrated form, the information given herein on the mass fractions in which the water-soluble sulfates are present in the batch is always related to their pure sulfate form, i.e. their non-hydrated form. Insofar as, for example, aluminum sulfate is present in the form of $Al_2(SO_4)_3*17\ H_2O$, the information given for this hydrate on the proportions by mass are related to the form of the non-hydrated aluminum sulfate, i.e. $Al_2(SO_4)_3$.

The binder used in the invention is an aqueous binder, i.e. a binder comprising water, in particular a water-based binder. Preferably, the binder comprises water. In addition to water, the binder may also comprise one or more further constituents, in particular, for example, at least one thickening agent, in particular a thickening agent in the form of polyacrylic acid.

According to a preferred form, the aqueous binder comprises water and polyacrylic acid.

The aqueous binder may preferably be present in the batch in a proportion of, for example, at least 4% by mass, even more preferably in a proportion of at least 7% by mass. Furthermore, the aqueous binder may preferably be present in the batch in a proportion of at most 15% by mass, even more preferably in a proportion of at most 10% by mass. Preferably, the aqueous binder in the batch can be present in a proportion in the range of 4 to 15% by mass, even more preferably in a proportion in the range of 7 to 10% by mass. If the binder is present in the batch in such proportions, it can be used in a particularly advantageous way as a casting compound. The above data in % by mass is in each case related to the total mass of the batch.

Insofar as the aqueous binder comprises the substances water and polyacrylic acid, the proportion of water in the binder may be in the range of 80 to 95% by mass and the proportion of polyacrylic acid in the range of 5 to 20% by mass, in each case relative to the total mass of the aqueous binder. In each case relative to the total mass of the aqueous binder, the proportion of water in the binder may particularly preferably be in the range of 85 to 92% by mass and the proportion of polyacrylic acid in the range of 8 to 15% by mass.

The aluminum component of the batch according to the invention consists of one or more carriers of metallic aluminum. Preferably, the aluminum component consists of one or more of the following carriers of metallic aluminum: metallic aluminum or at least one metal alloy comprising aluminum.

According to the invention, aluminum is present as "metallic" aluminum in the batch as long as it is not present in bonded form, for example not as an oxide, for example not in the form of corundum ($Al_2O_3$) or magnesia spinel ($MgAl_2O_4$).

Insofar as the aluminum component is present in the form of at least one metal alloy comprising aluminum, this metal alloy may in particular be present in the form of one or more of the metal alloys AlSi, AlMg or AlSiMg, i.e. a metal alloy consisting of the metal aluminum and at least one of the other metals silicon and magnesium. The aluminum component is particularly preferred as such a metal alloy in the form of AlSi. In accordance with the invention, it has been found that an aluminum component in the form of metallic aluminum can also form aluminum carbides which can be hydrated, for example $Al_4C_3$, when the batch according to the invention is heated up. Surprisingly, however, it turned out that an aluminum component in the form of one of the aforementioned metal alloys forms exclusively or largely aluminum oxycarbides which cannot be hydrated, for example $Al_4O_4C$, when the invention is heated up. In this respect, the hydration resistance of an unshaped refractory ceramic product produced from the batch according to the invention can be improved if the aluminum component is a metal alloy comprising aluminum, in particular in the form of at least one of the aforementioned metal alloys.

Insofar as the aluminum component is present in the form of one or more of the metal alloys AlSi, AlMg or AlSiMg, these alloys preferably consist of at least 70% by mass, relative to the total mass of the metal alloy, of aluminum, particularly preferably at least 80% by mass and still further preferably at least 85% by mass.

Preferably, the batch comprises the aluminum component in a proportion of at least 1% by mass, even more preferably in a proportion of at least 2% by mass and even more preferably in a proportion of at least 3% by mass. Furthermore, the batch according to the invention comprises the aluminum component preferably in a proportion of at most 10% by mass, even more preferably in a proportion of at most 8% by mass and even more preferably in a proportion of at most 6% by mass. In this respect, the batch can comprise the aluminum component in a proportion in the range of 1 to 10% by mass, more preferably in a proportion in the range of 2 to 8% by mass and even more preferably in a proportion in the range of 2 to 6% by mass. The above data in % by mass is each related to the total mass of the batch.

The aluminum component is preferably present in the form of powder or grit; in particular, the aluminum component is preferably present in a proportion of at least 90% by mass, relative to the total mass of the aluminum component, in a particle size below 500 μm, the particle size being determined in accordance with ISO 13320:2009-10. The advantage of using an aluminum component in powder form is in particular that it can be distributed very evenly and homogeneously over the batch.

The batch comprises a basic component that comprises one or more raw materials based on magnesia. Preferably, the basic component consists of one or more of the following raw materials based on magnesia: sintered magnesia or fused magnesia. Preferably, the basic component consists of sintered magnesia, especially preferably of high-purity sintered magnesia. According to a preferred embodiment, it is intended that the basic component consists of sintered magnesia with a content of at least 97% by mass MgO, relative to the total mass of the sintered magnesia.

In particular, it is provided that the basic component consists of at least 90% by mass of magnesia, i.e. MgO, more preferably at least 95% by mass and even more preferably at least 97% by mass, in each case relative to the total mass of the basic component. Insofar as the basic component consists of several raw materials based on magnesia, the composition of the basic component is selected in such a way that the basic component has the aforementioned proportions of magnesia.

The basic component is preferably present in a proportion of at least 75% by mass and even more preferably in a proportion of at least 80% by mass. Furthermore, it may be provided that the basic component is present in the batch according to the invention in a proportion of at most 95% by mass and even more preferably in a proportion of at most 90% by mass. In this respect, the basic component in the batch according to the invention can preferably be present in a proportion in the range of 75 to 95% by mass and even more preferably in a proportion in the range of 80 to 90% by mass. The above data in % by mass is each related to the total mass of the batch.

The basic component is preferably present in a grain size of less than 5.0 mm by at least 90% by mass, relative to the total mass of the basic component. According to a preferred embodiment, it is further provided that at least 10% by mass of the basic component, related to the total mass of the basic component, is preferably present in a proportion in the range of 10 to 35% by mass and even more preferably in a proportion in the range of 20 to 30% by mass, in a grain size below 100 μm. The grain size is determined according to DIN 66165-02:2016-08.

The batch has a carbon component which consists of one or more carbon carriers. Carbon carriers are raw materials which consist mainly of free carbon. Preferably the carbon component consists of one or more of the following carbon carriers: graphite or carbon black. Graphite can be present in particular in the form of flakes or spherical particles.

According to one embodiment, it is provided that the carbon component consists of at least 90% by mass, relative to the total mass of the carbon component, of free carbon, more preferably of at least 95% by mass and even more preferably of at least 99% by mass. Insofar as the carbon component is formed from several raw materials consisting predominantly of free carbon, the composition of the carbon component is selected in such a way that the carbon component has the aforementioned proportions of free carbon.

The carbon component is preferably present in a proportion of at least 2% by mass, more preferably in a proportion of at least 3% by mass and even more preferably in a proportion of at least 5% by mass. Furthermore, it may preferably be provided that the carbon component is present in the batch according to the invention in a proportion of at most 12% by mass, more preferably in a proportion of at most 9% by mass and even more preferably in a proportion of at most 7% by mass. In this respect, it may be provided, for example, that the batch according to the invention has a proportion of the carbon component in the range of 2 to 12% by mass, more preferably in a proportion in the range of 3 to 9% by mass and even more preferably in a proportion in the range of 5 to 7% by mass. The above data in % by mass is each related to the total mass of the batch.

The carbon component is preferably present in powder form. According to a preferred embodiment, it is provided that at least 90% of the carbon component, relative to the total mass of the carbon component, is present in a particle size below 500 μm, determined according to ISO 13320: 2009-10.

In accordance with the invention, it has been found that the batch according to the invention can react very sensitively to the presence of other components which are present in the batch in addition to the aforementioned components. According to a preferred embodiment, it is therefore provided that the batch consists of at least 95% by mass of the basic component, the carbon component, the aluminum component, the aqueous binder and the water-soluble sulfates, more preferably at least 97% by mass and even more preferably at least 99% by mass. The above data in % by mass is each related to the total mass of the batch.

Accordingly, it may be provided that the batch according to the invention—in addition to the basic component, the carbon component, the aluminum component, the aqueous binder and the water-soluble sulfates—has further components in a proportion of less than 5% by mass, relative to the total mass of the batch, more preferably in a proportion of less than 3% by mass and even more preferably in a proportion of less than 1% by mass.

As such further components, the batch may, for example, have one or more of the following components: microsilica, metallic silicon, dispersant or at least one binder in the form of resin, pitch, tar or bitumen.

A further component in the form of microsilica may be present in the batch, for example, in a proportion of not more than 5% by mass relative to the total mass of the batch. Microsilica may preferably be present in a proportion of at least 90% by mass, relative to the total mass of the microsilica, in a particle size less than 500 μm, and even more preferably in a particle size less than 200 μm, determined in accordance with ISO 13320:2009-10.

A further component in the form of metallic silicon can be present in the batch, for example, in a proportion of no more than 5% by mass, relative to the total mass of the batch. Metallic silicon may preferably be present in a grain size below 500 μm, determined according to ISO 13320:2009-10, in a proportion of at least 90% by mass, relative to the total mass of metallic silicon.

A further component in the form of dispersant may be present in the batch, for example, in a proportion of at most 1.0% by mass, preferably in a proportion in the range of 0.2 to 1.0% by mass and even more preferably in a proportion in the range of 0.2 to 0.8% by mass, in each case relative to the total mass of the batch.

Dispersant may be present in the form of one or more substances which have a good dispersing effect on the carbon component in the batch. In particular, the dispersant may, for example, be present in the form of one or more of the following substances: polycarboxylates, polycarboxylic acids, polyvinyls, polyvinyl acids or polyalcohols. The dispersant may be present in particular in the form of polycarboxylates, especially also in the form of modified polycarboxylates.

A further component in the form of at least one binder in the form of resin, tar, bitumen or pitch may be present in the batch, for example, in a proportion of at most 1.0% by mass. Preferably, such a binder is present in the batch in a proportion of at most 0.5% by mass, particularly preferably in a proportion of at most 0.1% by mass. The above data in % by mass is in each case relative to the total mass of the batch.

The subject of the invention is also a method for producing an unshaped refractory product, comprising the following steps:

Provision of a batch;

providing a vessel for holding a molten steel in a steel treatment plant;

casting the batch onto a portion of the vessel which comes into contact with the molten steel when the vessel is used in the plant;

heating the vessel such that the batch cast onto the portion forms an unshaped refractory ceramic product.

The batch according to the invention is therefore used in the form of a castable. The method according to the invention is particularly preferred in a plant for treating steel, i.e. in a plant for melting or casting steel, in particular in an electric arc furnace or in a continuous casting plant. Insofar as the method according to the invention is applied in a continuous casting plant, the vessel, on a portion of which the batch according to the invention is cast, may be, in particular, a converter or a ladle of the continuous casting plant. The batch can be cast in particular onto portions of the vessel in the form of joints, gaps or worn portions.

Within the scope of the invention, it turned out that the batch according to the invention is particularly suitable for lining and repairing the slag zone of a ladle for casting steel. The slag zone is known to be the area of a casting ladle that comes into contact with the slag on the molten steel. In this respect, it may be provided that, according to an embodiment of the method according to the invention, the vessel for holding a molten steel is provided in the form of a ladle and the batch is cast onto the slag zone of the ladle. The method according to the invention can be carried out in accordance with the state of the art in such a way that a template arranged in the casting ladle is used to form the inner contour of the casting ladle in the area of the slag zone by means of the batch. Such a state-of-the-art method is described, for example, in "Veitsch-Radex Rundschau", issue 1-2/1994, page 494.

According to an embodiment, it may be provided in this respect that the method according to the invention further comprises the following steps:

providing a template for the inner contour of a casting ladle in the area of the slag zone;

arranging the template in a casting ladle in such a way that an interspace is formed between the template and the casting ladle, the surface of the template delimiting the interspace corresponding to the inner contour of the casting ladle in the region of the slag zone.

The method step of casting the batch is performed as follows: casting the batch on the slag zone portion of the ladle by casting the batch into the interspace.

When the vessel is heated during operation, the aluminum component of the batch or the castable, respectively, initially reacts completely or largely with the carbon of the carbon component as well as atmospheric oxygen and atmospheric nitrogen to form aluminum oxycarbides and aluminum carbonitride, which already give the batch a high strength. From a temperature of about 1,000° C., the aluminum of the batch also partially forms magnesia spinel ($MgAl_2O_4$) with the magnesia of the basic component. If the vessel is heated further, more magnesia spinel is formed. This magnesia spinel is formed in particular in those areas where the aluminum component was present in addition to the base component in the batch. From a temperature of about 1,300° C., the microstructure of the ceramic product is formed, which consists in particular of grains of the basic component sintered together via magnesia spinel as well as aluminum oxycarbides and, as the case may be, aluminum carbonitride and $Al_2O_3$.

In this respect, the vessel is preferably heated to a temperature of at least 1,450° C. when carrying out the method according to the invention, particularly preferably to a temperature of about 1,600° C.

The unshaped refractory ceramic product produced by the method is then presented as an unshaped refractory ceramic product, i.e. an unshaped refractory product with a sintered bond or a ceramic sintered body. The sintered bond is formed in particular between the grains of the basic component in the form of sinter bridges of magnesia spinel.

The microstructure of an unshaped refractory product produced by the method according to the invention on the basis of the batch according to the invention differs in this respect from the microstructure of unshaped refractory products according to the state of the art, which have also been produced on the basis of a batch of magnesia and carbon. Whereas in the microstructure of an unshaped refractory product of the state of the art, which is produced from a batch based on magnesia and carbon, predominantly a carbon bond is present, in the microstructure of the unshaped refractory product according to the invention predominantly a sintered bond is present.

The subject of the present invention is also an unshaped refractory ceramic product obtained by a method according to the invention and comprising the following phases:
periclase;
magnesia spinel; and
aluminum oxycarbide.

The microstructure of the product according to the invention is essentially a matrix of grains of magnesia (periclase, MgO) sintered together via sinter bridges of magnesia spinel, with structural regions of aluminum oxycarbide and optionally aluminum carbonitride and corundum ($Al_2O_3$) embedded therein.

Preferably, a product according to the invention may consist of at least 95% by mass, relative to the total mass of the product, and particularly preferably 97% by mass of the above-mentioned phases.

The product according to the invention may preferably consist of at least 75% by mass, relative to the total mass of the product, more preferably in a proportion in the range from 75 to 90% by mass and even more preferably in a proportion in the range from 75 to 85% by mass of periclase. Furthermore, the product according to the invention may preferably consist of magnesia spinel and aluminum oxycarbide in a proportion in the range of 10 to 25% by mass, and even more preferably in a proportion in the range of 15 to 25% by mass, relative to the total mass of the product. Aluminum oxycarbide may preferably be present in the form of $Al_4O_4C$.

The unshaped refractory product according to the invention is characterized by an open porosity, which can be in the range of 16 to 22% by volume, determined according to DIN EN ISO 1927-8:2012.

Despite this high open porosity, the product according to the invention has good strength values. The product according to the invention may have at least one of the following physical properties, whereby the properties are determined according to DIN EN ISO 1927-8:2012 on a refractory ceramic product produced from the batch after coking at 1,500° C. (under reducing atmosphere):

Bulk density: 2.55-2.70 g/cm$^3$;
Open porosity: 16-22% by volume;
Cold bending strength: 0.5-5 MPa;
Cold compressive strength: 15-40 MPa;
Hot bending strength (1,400° C., reducing atmosphere): 5-8 MPa;
Hot bending strength (1,500° C., reducing atmosphere): 4-7 MPa.

Further features of the invention result from the claims as well as the following exemplary embodiments of the invention.

All features of the invention may, individually or in combination, be combined with each other.

EXAMPLE 1

According to an exemplary embodiment of the invention, a batch was provided, which consisted of the following components in the following mass proportions, each related to the total mass of the batch:

A basic component of sintered magnesia: 82% by mass;
a carbon component in the form of microcrystalline graphite: 5.5% by mass;
an aluminum component in the form of an AlSi alloy: 3.8% by mass;
an aqueous binder: 7% by mass;
water-soluble sulfate: 0.5% by mass;
microsilica: 1% by mass; and
dispersant: 0.2% by mass.

The sintered magnesia of the basic component was available in high-purity form with a MgO content of 98.0% by mass, relative to the total mass of the sintered magnesia. In addition, the sintered magnesia had an $SiO_2$ content of 0.2% by mass and a CaO content of less than 0.9% by mass. The sintered magnesia had a maximum average grain size of 6 mm and over 90% by mass, relative to the total mass of the sintered magnesia, had a grain size of less than 5 mm.

The aluminum component was present in the form of an AlSi alloy, i.e. a metal alloy of aluminum and silicon, consisting of 88% by mass of metallic aluminum and 12% by mass of metallic silicon, each relative to the total mass of the aluminum component.

The aqueous binder consisted of water and polyacrylic acid with a proportion of water of 88% by mass and a proportion of polyacrylic acid of 12% by mass, in each case relative to the total mass of the binder, the polyacrylic acid in turn being present in a concentration of 50% by mass polyacrylic acid to 50% by mass water.

The water-soluble sulfate was present in the form of aluminum sulfate dissolved in the water of the binder.

The dispersant was present in the form of a free-flowing powder based on modified polycarboxylate.

The particle size distribution of these components, determined according to ISO 13320:2009-10, was as shown in Table 1 below:

TABLE 1

| Component | d10 [μm] | d50 [μm] | d90 [μm] | Proportion of component <63 μm [% by mass] |
| --- | --- | --- | --- | --- |
| Graphite | 2.5 | 20.5 | 79.1 | 82 |
| AlSi alloy | 20.8 | 68.6 | 130.1 | 44.4 |
| Aluminum sulfate | 24.4 | 183.1 | 399.4 | 20.3 |
| Microsilica | 1.3 | 9.8 | 141.1 | 77.0 |
| Dispersant | 10.6 | 44.9 | 122.0 | 65.2 |

The components of the batch were intimately mixed together so that a homogeneous batch was subsequently present. The batch was then used in the form of a castable. For this purpose, the batch was cast onto the portion of a ladle for casting molten steel, which would be in the area of the slag zone of the molten steel when using the ladle. When using the ladle, it was then heated to a temperature of about 1,600° C. During the heating method, the AlSi alloy initially formed aluminum oxycarbides with the carbon component and atmospheric oxygen, which already gave the basic component a certain degree of strength until sintering began. From a temperature of about 1,300° C. onwards, the aluminum also formed magnesia spinel with the magnesia of the basic component. Finally, from a temperature of about 1,450° C., a sinter bond formed between the grains of the basic component. After sintering, an unshaped refractory ceramic product was obtained from the batch, which consisted of the following phases: periclase, magnesia spinel and aluminum oxycarbide for more than 95% by mass, relative to the total mass of the product.

The oxide analysis of the product (XRF) was as follows:
MgO: 89.8% by mass
$Al_2O_3$: 6.6% by mass
$SiO_2$: 2.3% by mass
CaO: 0.8% by mass
$Fe_2O_3$: 0.5% by mass The loss on ignition was 5.8% by mass (after XRF at 1,050° C. annealing). The carbon content was 5.0% by mass, based on the product without the carbon (according to LECO-C analysis before annealing).

The product was characterized by the following physical properties, determined according to DIN EN ISO 1927-6: 2012:
Test values after 110° C. under reducing conditions:
Bulk density: 2.64 g/cm3
Open porosity: 14% by volume
Cold bending strength: 8 MPa
Cold compressive strength: 34 MPa.

The product was also characterised by the following physical properties, determined according to DIN EN ISO 1927-8:2012:
Test values after 1.000° C. under reducing conditions:
Bulk density: 2.60 g/cm$^3$
Open porosity: 20% by volume
Cold bending strength: 2 MPa.
Cold compressive strength: 20 MPa.
Test values after 1.500° C. under reducing conditions:
Bulk density: 2.57 g/cm$^3$
Open porosity: 21% by volume
Cold bending strength: 3 MPa
Cold compressive strength: 20 MPa
Hot bending strength (1,400° C., reducing atmosphere): 6.5 MPa
Hot bending strength (1,500° C., reducing atmosphere): 5.5 MPa.

EXAMPLE 2

Within the scope of a second exemplary embodiment, a corrosion test according to the so-called "Induction Crucible Furnace Test" (ITO test) was carried out to check the corrosion resistance of a product in accordance with the invention.

For this purpose, an exemplary embodiment of a batch V1 according to the invention and a batch V2 according to the state of the art were first produced.

The batch V1 according to the invention consisted of the following components in the following mass proportions, each related to the total mass of the batch:
A basic component of sintered magnesia: 81% by mass;
a carbon component in the form of microcrystalline graphite and soot: 7% by mass;
an aluminum component in the form of an AlSi alloy: 4% by mass; metallic silicon: 0.5% by mass;
an aqueous binder: 7.2% by mass;
water-soluble sulfate: 0.3% by mass.

The batch V2 according to the state of the art consisted of the following components in the following mass proportions, each related to the total mass of the batch:
A basic component of sintered magnesia: 82% by mass;
a carbon component in the form of microcrystalline graphite and soot: 6.5% by mass;
metallic silicon: 2% by mass;
microsilica: 2.5% by mass;
an aqueous binder: 7% by mass.

The sintered magnesia, the aluminum component, the aqueous binder, the water-soluble sulfate and the microsilica were present as shown in example 1.

The components of the batches V1 and V2 were each intimately mixed together, then cast into molds and finally heated to about 1,600° C. after drying.

Products V1 were then obtained from the batch V1 and products V2 from the batch V2.

To test the corrosion resistance of the products V1 and V2, they were used as part of a furnace lining, on which a corrosion test was carried out according to the so-called "Induction Crucible Furnace Test" (ITO test) as follows: First of all, a furnace was constructed with a refractory lining made of stone segments on the wall side. In the later slag area, the lining was made of stone segments of products V1 and V2. The refractory lining enclosed a circular-cylindrical furnace chamber, in which a suitable circular-cylindrical metal insert (60 kg steel) was placed. The metal insert was heated to 1,700 ° C. and melted by coils which were guided in a ring around the outside of the lining.

A slag powder (3 kg with the chemical composition according to Table 2; ratio CaO/SiO$_2$ of 0.7) was added to the molten steel, which melted and formed a slag area with a corrosive slag. The slag reacted in this slag area with the stone segments V1 and V2 and corrosively damaged them. The stone segments were corroded by the slag for a total of about 4 hours, whereby the slag was replenished by 5% by mass fluorspar in each case after 30, 60 and 90 minutes and by 10% fluorspar in each case after 120, 150, 180 and 210 minutes. The lining was then removed and the degree of corrosion was tested on the stone segments V1 and V2, namely the wear depth and the wear surface.

TABLE 2

| Component of the slag | Proportion in the slag [% by mass in relation to total mass of slag] |
|---|---|
| SiO$_2$ | 42.0 |
| CaO | 31.0 |
| Al$_2$O$_3$ | 11.0 |
| Fe$_2$O$_3$ | 10.0 |
| MnO | 3.8 |
| MgO | 0.8 |
| Others | 1.4 |

Table 3 shows the results of this corrosion test. The "wear surface" indicates the average value of the maximum cross-sectional area of the corroded areas of the stone segments V1 and V2, while "wear depth" indicates the average value of the maximum wear depth of the stone segments V1 and V2. As the values in Table 3 show, these values for the stone segments V1 according to the invention are significantly below the values for the stone segments V2 according to the state of the art.

TABLE 3

| Size | V1 | V2 |
|---|---|---|
| Wear surface [cm$^2$] | 18.3 | 34.7 |
| Wear depth [mm] | 27.5 | 44.0 |

The invention claimed is:

1. A refractory batch comprising the following components:
   1.1 a basic component comprising one or more raw materials based on magnesia;
   1.2 a carbon component comprising one or more carbon carriers;
   1.3 an aluminum component comprising one or more metallic aluminum carriers;
   1.4 an aqueous binder; and
   1.5 aluminum sulfate.

2. The refractory batch according to claim 1, wherein the basic component consists of at least 90% by mass of magnesia.

3. The refractory batch according to claim 1, wherein the basic component consists of one or more of the following raw materials based on magnesia: sintered magnesia and fused magnesia.

4. The refractory batch according to claim 1, wherein the basic component is present in a proportion of at least 75% by mass relative to a total mass of the refractory batch.

5. The refractory batch according to claim 1, wherein the aluminum component consists of one or more of the following carriers of metallic aluminum: metallic aluminum and at least one metal alloy comprising aluminum.

6. The refractory batch according to claim 1, wherein the aluminum sulfate is present in a proportion in range from 0.05 to 1.0 % by mass relative to a total mass of the refractory batch.

7. The refractory batch according to claim 1, wherein the aqueous binder is present in a proportion in range from 4.0 to 15.0% by mass relative to total mass of the refractory batch.

8. A method for producing an unshaped refractory ceramic product, comprising the following steps:
   9.1 providing a refractory batch, the refractory batch comprises:
      a basic component comprising one or more raw materials based on magnesia;
      a carbon component comprising one or more carbon carriers;
      an aluminum component comprising one or more metallic aluminum carriers;
      an aqueous binder; and
      aluminum sulfate;
   9.2 providing a vessel for holding a molten steel in a steel treatment plant;
   9.3 casting the refractory batch onto a portion of the vessel which comes into contact with the molten steel when the vessel is used in the plant; and
   9.4 heating the vessel so that the refractory batch cast on the portion forms an unshaped refractory ceramic product.

9. A product obtained by a method, the method comprising:
   providing a refractory batch, the refractory batch comprises:
      a basic component comprising one or more raw materials based on magnesia;
      a carbon component comprising one or more carbon carriers;
      an aluminum component comprising one or more metallic aluminum carriers;
      an aqueous binder; and
      aluminum sulfate;
   providing a vessel for holding a molten steel in a steel treatment plant;
   casting the refractory batch onto a portion of the vessel which comes into contact with the molten steel when the vessel is used in the plant; and
   heating the vessel so that the batch cast on the portion forms an unshaped refractory ceramic product,
   wherein the product comprises the following phases:
      periclase;
      magnesia spinel; and
      aluminum oxycarbide.

10. The product according to claim 9, having at least one of the following physical properties:
   bulk density: 2.55 to 2.70 g/cm$^3$;
   open porosity: 16 to 22% by volume;
   cold bending strength: 0.5 to 5 MPa;
   cold compressive strength: 15 to 40 MPa;
   hot bending strength at 1,400° C. in a reducing atmosphere: 5 to 8 MPa; or
   hot bending strength at 1,500° C. in a reducing atmosphere: 4 to 7 MPa.

* * * * *